US009300927B2

(12) United States Patent
Hoogenstraaten et al.

(10) Patent No.: US 9,300,927 B2
(45) Date of Patent: Mar. 29, 2016

(54) FINGERPRINT, APPARATUS, METHOD FOR IDENTIFYING AND SYNCHRONIZING VIDEO

(75) Inventors: Willem Franciscus Johannes Hoogenstraaten, Eindhoven (NL); Cornelis Wilhelmus Kwisthout, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1933 days.

(21) Appl. No.: 12/304,184

(22) PCT Filed: Jun. 11, 2007

(86) PCT No.: PCT/IB2007/052187
§ 371 (c)(1),
(2), (4) Date: Dec. 10, 2008

(87) PCT Pub. No.: WO2007/144813
PCT Pub. Date: Dec. 21, 2007

(65) Prior Publication Data
US 2009/0167942 A1    Jul. 2, 2009

(30) Foreign Application Priority Data

Jun. 13, 2006 (EP) .................................. 06115337

(51) Int. Cl.
*H04N 5/04* (2006.01)
*H04N 5/14* (2006.01)
(Continued)

(52) U.S. Cl.
CPC .............. *H04N 7/24* (2013.01); *H04N 21/4131* (2013.01); *H04N 21/4307* (2013.01); *H04N 21/4622* (2013.01); *H04N 21/8133* (2013.01); *H04N 21/8456* (2013.01)

(58) Field of Classification Search
CPC .......... H04N 21/4131; H04N 21/4307; H04N 21/4622; H04N 21/8133; H04N 21/8456; H04N 7/24

USPC ............ 348/500, 473, 512, 515, 700, E5.009, 348/E5.062, E5.067, E5.108; 375/240.16; 382/103, 159, 181, 236; 707/E17.028; 725/9, 13, 24, 135
See application file for complete search history.

(56) References Cited

U.S. PATENT DOCUMENTS

| 4,677,466 A | 6/1987 | Lert, Jr. |
| 6,337,883 B1 | 1/2002 | Tanaka |

(Continued)

FOREIGN PATENT DOCUMENTS

| JP | 2002199333 A | 7/2002 |
| WO | WO02065782 A1 | 8/2002 |

(Continued)

OTHER PUBLICATIONS

Gauch J M et al., "Identification of New Commercials Using Repeated Video Sequence Detection", p. Image Processing, 2005. ICIP 2005. IEEE International Conference on Genova, Italy Sept. 11-14, 2005, Piscataway, NJ, USA, IEEE, Sep. 11, 2005, pp. 1252-1255, XP010851625.

(Continued)

*Primary Examiner* — Geepy Pe
*Assistant Examiner* — Syed Hasan
(74) *Attorney, Agent, or Firm* — Larry Liberchuk (57) ABSTRACT

There is provided a fingerprint (340) for a video stream (110) comprising a sequence of scenes (200a, 200b, 200c), wherein the fingerprint (340) includes information indicative of durations of the scenes (200a, 200b, 200c). The information indicative of the durations of the scenes (200a, 200b, 200c) is included in the fingerprint (340) in an order in which the scenes (200a, 200b, 200c) are included in the video stream (110). Moreover, each duration is optionally defined as a count of a number of video frames (260, 270) therein. The method is capable of generating a fingerprint which is susceptible to more simply and more efficiently synchronizing first and second data signals together.

9 Claims, 3 Drawing Sheets

(51) Int. Cl.
| | |
|---|---|
| *H04N 7/00* | (2011.01) |
| *H04N 7/12* | (2006.01) |
| *H04N 9/475* | (2006.01) |
| *H04H 60/33* | (2008.01) |
| *G06K 9/00* | (2006.01) |
| *G06K 9/62* | (2006.01) |
| *H04N 7/24* | (2011.01) |
| *H04N 21/41* | (2011.01) |
| *H04N 21/43* | (2011.01) |
| *H04N 21/462* | (2011.01) |
| *H04N 21/81* | (2011.01) |
| *H04N 21/845* | (2011.01) |

(56) References Cited

U.S. PATENT DOCUMENTS

| | | | |
|---|---|---|---|
| 6,493,872 B1 | 12/2002 | Rangan | |
| 6,583,821 B1 | 6/2003 | Durand | |
| 6,654,067 B1 * | 11/2003 | Mc Gee et al. | 348/700 |
| 7,587,064 B2 * | 9/2009 | Owechko et al. | 382/103 |
| 7,692,724 B2 * | 4/2010 | Arora et al. | 348/515 |
| 2002/0120925 A1 * | 8/2002 | Logan | 725/9 |
| 2005/0025361 A1 * | 2/2005 | Gadre et al. | 382/181 |

FOREIGN PATENT DOCUMENTS

| | | |
|---|---|---|
| WO | WO02097791 A1 | 12/2002 |
| WO | WO03098627 A2 | 11/2003 |
| WO | WO2004028153 A1 | 4/2004 |
| WO | WO2005006758 A1 | 1/2005 |
| WO | WO2005011281 A1 | 2/2005 |
| WO | WO2005050620 A1 | 6/2005 |
| WO | WO2005069637 A1 | 7/2005 |
| WO | WO2005069640 A1 | 7/2005 |
| WO | WO2005073968 A1 | 8/2005 |

OTHER PUBLICATIONS

Naturel X et al., "A Fast Shot Matching Strategy for Detecting Duplicate Sequences in a Television Stream", Proceedings of the International Workshop on Computer Vision Meets Databases, ACM, New York, NY, US, Jun. 17, 2005, pp. 21-27, XP002452077.

* cited by examiner

FINGERPRINT, APPARATUS, METHOD FOR IDENTIFYING AND SYNCHRONIZING VIDEO

The present invention relates to a fingerprint for a video stream comprising a sequence of scenes and to its use in general and in an apparatus operable to synchronize secondary media to video streams; for example, the present invention concerns a problem in apparatus of synchronizing an ambilight script with a video stream. Moreover, the present invention also relates to methods using the fingerprint for identifying the video stream and for synchronizing secondary media to video streams, for example in relation to aforesaid ambilight. Furthermore, the present invention relates to software executable on computing hardware operable to implement such methods.

Figure 1:
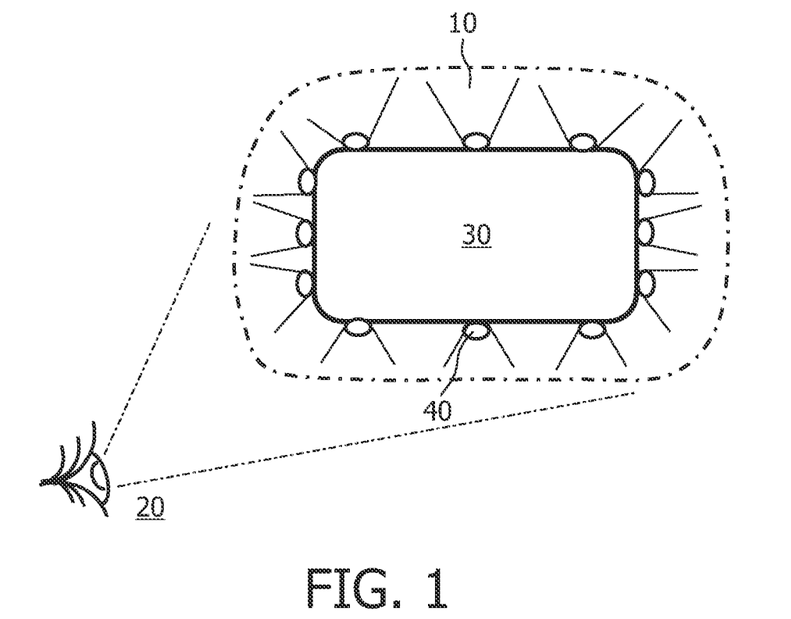
FIG. 1 is a simple representation of an ambilight system.

"Ambilight" is an enhancement to televisions and similar image display devices. Referring to FIG. 1, ambilight concerns a peripheral halo of light 10 appearing in operation to a user 20 to surround at least part of a peripheral region of a television display screen 30 or similar display device; the display screen 30 can be based upon cathode ray tube technology, plasma pixel technology, liquid crystal display (LCD) technology, light emitting diode (LED) and/or organic light emitting diode (OLED) technology to mention merely a few examples. Ambilight exploits a characteristic that eyes of the user 20 are provided by evolution or otherwise with greatest spatial resolution at central regions of their field of view, and a more diffuse spatial resolution at peripheral regions of their field of view. Thus, to provide the user 20 with an enhanced viewing experience, it is desirable to present the user 20 with an expansive displayed image which is required to include most spatial and color information at a central region thereof. For reasons of data economy and display manufacturing economy, ambilight is susceptible to providing the user 20 with an expansive displayed image with most spatial and color information presented at a central region of the expansive displayed image to which the eyes of the user 20 are most receptive. The aforesaid peripheral halo 10 can be generated from various peripheral light sources, for example from a light source 40, whose color and light output are varied in response to images being presented on the associated television display screen 30 or similar device.

In a more basic implementation of ambilight, information to drive the peripheral light sources is derived from images presented on the television display screen 30. Such an approach renders ambilight operation possible from existent video material, for example from existing video tapes, DVD's and video material downloaded via communication networks, for example via the Internet or via satellite links. Of operational concern with ambilight derived from existent video material is that the peripheral halo should not only correctly complement color-wise video material presented on the television 30 to the user 20, but also temporally follow substantially accurately changes in general color of images presented on the television 30. Contemporarily, images on the television screen 30 are analyzed for spatial color content and the corresponding drive to the peripheral lights 40 derived from results of the spatial color content analysis. Such analysis is implementable in digital hardware, or computing hardware operable to execute software causing the computing hardware to perform such analysis.

As an advance on known ambilight elucidated in the foregoing, it is desirable to provide to the user 20 data streams or data files providing an ambilight script. Namely, instead of deriving in real time drive for the peripheral lights 40 from video images presented on the television screen 30, it is desirable, for example as an additional service to the user 20, to provide an ambilight script to accompany existent video material and also future video material. It is further appreciated that such ambilight script is susceptible to being provided to the user 20 via several possible alternative routes, for example downloaded as a file via Internet, as a separate CD or DVD or similar type of data carrier, as a data stream conveyed by wireless or satellite link. These alternative routes are contemporarily known as "multimedia".

Figure 2:
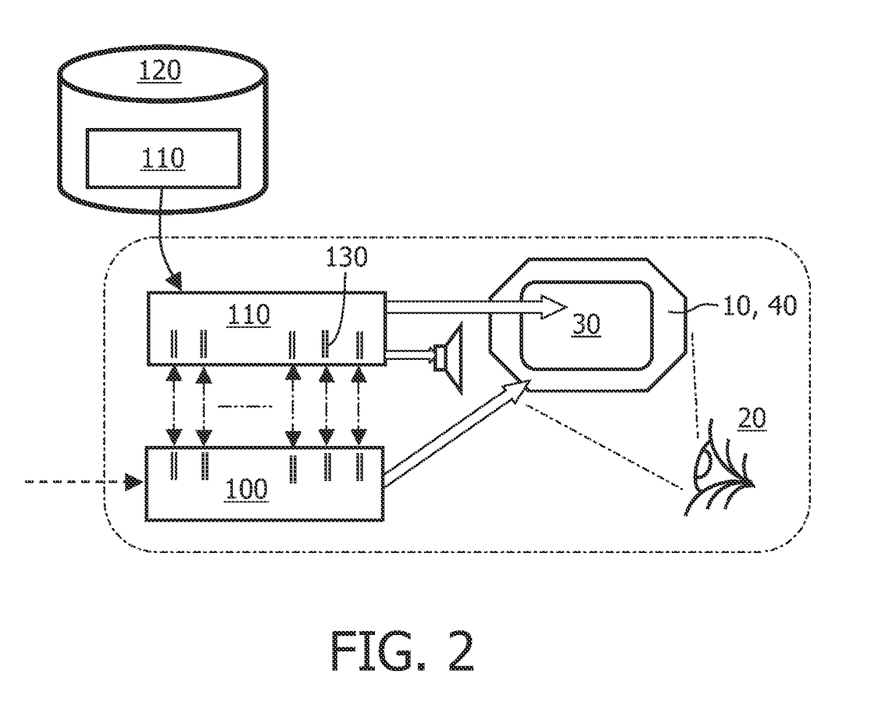
FIG. 2 is an illustration of data synchronization pertinent to the system of FIG. 1.

Referring to FIG. 2, a technical problem, which is at least partially addressed by the present invention, arising as a consequence of such an advance in known ambilight is a method of synchronizing a received ambilight script 100 to corresponding video material 110 already in possession of the user 20, receivable by a device of the user 20, or stored on a database 120 and potentially accessible to the user 20. This technical problem is further exacerbated when the video material 110 is substantially devoid of any synchronization markers 130 or similar which would enable temporal synchronization of the ambilight script 100 to the video material 110 so that the script 100 and the video material can in synchronism in operation be output to the television 30 and ambilight light sources 40.

Methods of synchronizing two or more signals together are known. For example, in a published international PCT patent application PCT/IB2004/051259 (WO 2005/011281), there is described a device and a method of generating a first fingerprint and a second fingerprint usable for synchronization of at least two signals. In the method, a fingerprint pair is generated on a basis of a segment of a first signal and a segment of the second signal; in other words, a fingerprint is not generated for an entirety of the first signal and the second signal but only a portion thereof. For example, the first signal is an audio signal and the second signal is a video signal wherein the audio signal and the video signal are to be accurately temporally synchronized when presented to a user for consumption. In the method described in the aforesaid patent application, generated fingerprint pairs pertaining to the audio and video signals are stored in a database and are communicated or distributed to a synchronization device. During synchronization of the audio and video signals using the synchronization device, fingerprints of both the audio signal and of the video signal are generated by the synchronization device, these fingerprints being matched against fingerprints in the database. When a match is found, the fingerprints are capable of being used to determine synchronization time points, these time points being usable to synchronize to audio and video signals together. Moreover, such synchronization can be achieved without a need to modify either the audio signal or the video signal.

The method described in the published PCT patent application suffers a problem that fingerprint pairs have to be prepared and stored in a database for both audio as well as for video. Moreover, during synchronization, access to the database for fingerprint pair matching purposes may be inconvenient or costly to provide in real-time. Thus, in respect of consumer equipment, it is not always practicable or feasible to provide a connection to such a database having stored therein preprocessed fingerprint pairs. A further drawback of this method is that it is computationally unattractive, in that a considerable amount of resources are needed for the required calculations. A still further drawback of this method is that it is vulnerable for changes of the video format. Eg a fingerprint generated for standard density video will typically fail when the video format including the fingerprint is converted to a high density video format. Similarly, a fingerprint generated for a frame ratio of 21:9 will typically fail after the video has been cropped for a frame ratio of 16:9.

Thus, the technical problem at least partially addressed by the present invention is to provide an alternative method of synchronizing two data signals, especially in the context of aforesaid ambilight technology.

An object of the present invention is to provide an alternative method, and apparatus operable to implement the alternative method, for generating a fingerprint from a first data signal; the fingerprint is optionally susceptible to being employed to synchronizing the first data signal to a second data signal, for example for temporally synchronizing ambilight script and video content in the context of ambilight.

According to a first aspect of the invention, there is provided a fingerprint for a video stream comprising a sequence of scenes, wherein the fingerprint includes information indicative of durations of the scenes.

A fingerprint for a video stream may be considered an encoding of the video stream in that it provides for identifying the video stream based on a condensed piece of information. However, the fingerprint typically does not provide enough information on its own to reconstruct the video stream from it. The concept of a fingerprint of a video stream is known as such. Similarly, the concept of a scene is known as such in the field of video, as detailed below.

The basic idea of a fingerprint is that it serves as a compact representation of an input string, and that it can be used as if it were uniquely identifiable with that string. The invented fingerprint has inter alia the purposes to identify the video stream or to synchronize with it. This may be achieved by comparing fingerprints of respective video streams, rather than comparing the video streams. Alternatively, this may be achieved by comparing a partial fingerprint obtained from a part of a video stream against a part of the fingerprint of the complete video stream. The fingerprint further enables to determine the temporal position of a fragment of the video stream in the complete video stream, the fragment being a part of the complete video stream.

This fingerprint has a low computational complexity compared to existing fingerprints. For some video distribution formats like MPEG, the decoders already perform scene change detection for optimizing allocating decoder resources. Hence, this fingerprint may be implemented with very little additional costs in such decoders. Particularly, the fingerprint may, rather than include, consist of the information indicative of durations of the scenes. Surprisingly, even if the fingerprint only consists of that information, this still leads to a unique fingerprint if it pertains to only a couple of scene changes. This is caused by a large variability in scene durations of typical video streams, particularly if measured with a resolution up to a single frame.

This fingerprint is robust for changing or transcoding video formats, because the scene durations are typically not affected by such operations.

This fingerprint enables a relatively efficient method for identification of any video stream comprising a sequence of scenes. It also enables to identify a video stream that is only received from a certain point in time, after missing the start of the video stream by eg zapping into the middle of a broadcasted movie. One such method operates as follows. First a frame counter is reset. Upon detection of a scene change, the counter is read out and subsequently reset. The read out value is, after optional transportation, fed into a matching device which determines a subset of a set of records. Each record in the subset has an associated fingerprint that matches with the read out value. A fingerprint matches the read out value if this value occurs in the fingerprint. Alternatively, a fingerprint may match the value if a further value occurs in the fingerprint, whereby a difference measure between the value and the further value does not exceed a threshold, so as to accommodate for minor errors. The threshold may be predetermined or it may depend on the value, to provide for robustness, eg against missing frames in relatively long scenes.

The previous steps are repeated, whereby the matching device continues with the previously established subset, until the obtained subset either contains a single record identifying the video stream, or until the subset is empty, when the video stream has no associated record in the initial set. In case of a remote matching device, the final result may be returned to the location where the frames are counted. Alternatively, the matching device may only start matching if a number of frame counts have been accumulated in a tuple. This has the advantage that searching the records can be made much more efficient, because eg no intermediate subsets need to be kept.

Identifying video streams has several applications on its own, like linking to metadata pertaining to the video stream, eg title, actors, music, if the video stream is a movie, or artist, album, point of sales if the video stream is a video clip for a song.

The duration of a scene may be determined by counting the frames of a scene. However, as is known in the art, different frame rates are in use across the globe. Hence, to further increase the robustness of the fingerprint for conversion of the frame rate of the video, the fingerprint may take the frame rate into account. This may be achieved in various ways.

In a first way, the duration is determined by counting the frames of a scene and multiplying the obtained frame count by the frame period, the latter being the fixed amount of time between two consecutive frames. In this way the scene duration is obtained. With this first way, the fingerprint only needs to contain the information indicative of the duration. This way has the advantage that it is open-ended for future frame rates currently not in use. The obtained duration may be expressed in a predetermined unit like the second, and be encoded in the fingerprint as a floating-point number. Advantageously, the duration is expressed as an integer multiple of a much smaller predetermined unit like a millisecond or a microsecond, and be encoded in the fingerprint as a binary integer number.

In a second way, one particular frame rate is predetermined to be the default. Each fingerprint comprises durations in that one particular frame rate. If a scene duration is determined by counting frames with a frame rate different from the one particular frame rate, the obtained frame count is converted to the one particular frame rate. In an example, the one particular frame rate is predetermined to be 300 Hz. In the example, a frame count pertaining to a frame rate of 50 Hz is multiplied by six, while a frame count pertaining to a frame rate of 60 Hz is multiplied by five. This way has the advantage that the fingerprint itself does not need to comprise additional information, because the one particular frame rate is implicit in the fingerprint.

In a third way, the fingerprint additionally comprises information indicative of the frame rate at which the frames were counted, next to the frame count. In one example, one additional single bit of the fingerprint denotes the frame rate to which the frame counts of that fingerprint pertain. If, in the example, in a fingerprint the one additional single bit is set to one, the frame counts in that fingerprint pertain to a 60 Hz frame rate, whereas if the one additional single bit is set to zero, the frame counts in that fingerprint pertain to a 50 Hz frame rate. This example has the advantage of only requiring a single bit for encoding the frame rate. Other examples are possible, wherein several bits are used to denote one out of a plurality of predetermined frame rates. This third way has the advantage that a single fingerprint format supports several frame rates.

In a fourth way, the fingerprint merely comprises frame counts and heuristics are applied to determine the frame rate to which the frame rates pertain. In one example, if the video signal is in accordance with the NTSC standard the frame rate may be inferred to be 60 Hz, whereas if the video signal is in accordance with the PAL standard, the frame rate may be inferred to be 50 Hz.

Several other ways may be applied to determine the scene durations based on frame counts, for example by combining measures of the above ways.

In one application of the fingerprint according to claim 1, the fingerprint is associated to an ambilight script. An entertainment device like a television set or a multimedia center or PC, equipped with ambilight "light speakers" displays the video stream on its screen. As is known in the art, the video content may be analyzed by the television set such that, for example, the light speakers mimic and extend the colors on the screen.

The entertainment device determines scene changes in the video stream, computes a partial fingerprint of the video stream, and matches the partial fingerprint to the fingerprint associated with the ambilight script. As soon as a match is found, the now synchronized ambilight script takes over from the video content being analyzed, to determine the colors of the light speakers.

While the ambilight script is controlling the light speakers, the entertainment device continues determining scene changes in the video stream, for detecting a loss of the synchronization. If a loss of the synchronization is detected the ambilight script stops controlling the light speakers and the entertainment device reverts to analyzing the video content for controlling the light speakers. After a loss of the synchronization, the entertainment device still continues determining scene changes in the video stream, for attempting to restore the synchronization with the ambilight script.

Several heuristics may be applied for the detecting a loss of the synchronization and for the restoring of the synchronization.

In a first heuristic, a loss of the synchronization may be detected as soon as a scene change is detected in the video stream at an instant at which the synchronized fingerprint does not prescribe a scene change. This has the advantage of a fast response time of detecting the loss.

In a second heuristic, a loss of the synchronization may be detected as soon as two consecutive scene changes are detected in the video stream, both at instances at which the synchronized fingerprint does not prescribe any scene change. This has the advantage that it may prevent falsely detecting a loss of synchronization.

In a third heuristic, a loss of the synchronization may be detected based on another signal derived from the video stream or from the user operating the entertainment device. For one example, at some instant a block of commercials may be expected to be broadcast as part of the video stream. For another example, the user operating a remote control to switch to another channel may result in the detection of loss of the synchronization immediately. This has the advantage that detection of a loss of synchronization does not solely depend upon detecting scene changes.

Similarly for restoring the synchronization various heuristics may be applied.

In a first heuristic for restoring, the restoring is based on the context of the preceding loss of the synchronization. For one example, if the loss of the synchronization was lost by the user selecting a different channel, the synchronization may be restored sooner after the user returns to the previous channel, when the entertainment device stores the context of the loss. The context may comprise the channel together with an association to the matched fingerprint and the point in time or the frame count where the loss occurred. For another example, if the loss was caused by a commercial break, the restoring may be attempted after e.g. 30 seconds, the typical length of a commercial break in this example. Also, the restoring may take into account that a piece of the video stream just before the break is repeated after the break. Such piece typically lasts between a couple of seconds and a fraction like half a minute. This may be achieved by correcting the partial fingerprint for the commercial break, for example by cutting out the scene changes that are part of the commercial break from the partial fingerprint. The corrected partial fingerprint is then matched against the complete fingerprint associated to the ambilight script. Correcting the partial fingerprint may also entail cutting out a repeated piece.

The fingerprint is also suitable for synchronizing other media types with the video stream, notably subtitles.

The invention is of further advantage in enabling a method of generating a fingerprint which is susceptible to more simply and more efficiently synchronizing first and second data signals together.

Optionally, the information indicative of the durations of the scenes is included in the fingerprint in an order in which the scenes are included in said video stream.

Such fingerprint provides for simultaneous identification of and synchronization with a video stream, because as soon as the fingerprint contains enough durations to be unique over an initial set of records, also the offset between the current frame count number and the start of the video stream may be determined.

Optionally, in the fingerprint, each duration is defined as a count of a number of video frames therein.

Some MPEG decoders already perform scene change detection for optimizing allocating decoder resources: effectively only a frame counter needs to be added. Hence, this fingerprint may be implemented with very little additional costs in such decoders.

Optionally, in the fingerprint, the durations are defined by scene changes corresponding to one or more of:
(a) abrupt video material illumination changes between at least a last image of an earlier scene in relation to at least a first image of a subsequent scene in the video stream;
(b) abrupt changes in spatial image feature information between the at least last image of the earlier scene in relation to the at least first image of the subsequent scene in the video stream; and
(c) abrupt changes in audio information associated with the at least last image of the earlier scene in relation to the at least first image of the subsequent scene in the video stream.

According to a second aspect of the invention, there is provided an apparatus operable to generate a fingerprint according to the first aspect of the invention, the apparatus including:
(a) a data input arrangement for receiving a video stream;
(b) a data processor for analyzing the video stream conveyed via the input arrangement for detecting occurrences of scene changes therein, and for computing durations of scenes included in the video stream from the detected occurrence of scene changes, and for generating from the durations the fingerprint.

Optionally, in the apparatus, the processor is operable to detect scene changes within the video stream by analysis based on one or more of:

(a) abrupt video material illumination changes between at least a last image of an earlier scene in relation to at least a first image of a subsequent scene;
(b) abrupt changes in spatial image feature information between the at least last image of the earlier scene in relation to the at least first image of the subsequent scene; and
(c) abrupt changes in audio information associated with the at least last image of the earlier scene in relation to the at least first image of the subsequent scene.

According to a third aspect of the invention, there is provided a method of generating a fingerprint according to the first aspect of the invention from a video stream, wherein the method includes steps of:
(a) receiving the video stream;
(b) detecting occurrences of scene changes in the video stream;
(c) computing durations of scenes included in the video stream from the detected occurrence of scene changes; and
(d) generating the fingerprint from the durations.

Optionally, in the method, step (b) involves detecting scene changes within the video stream by analysis based on one or more of:
(a) abrupt video material illumination changes between at least a last image of an earlier scene in relation to at least a first image of a subsequent scene;
(b) abrupt changes in spatial image feature information between the at least last image of the earlier scene in relation to the at least first image of the subsequent scene; and
(c) abrupt changes in audio information associated with the at least last image of the earlier scene in relation to the at least first image of the subsequent scene.

It is worth mentioning that other steps and techniques for scene change detection may also be applied. As a matter of fact, it is to some extent irrelevant what exactly is detected, as long as the same detector is used for both creating the fingerprint and for analyzing the video stream to obtain the partial fingerprint.

According to a fourth aspect of the invention, there is provided a method of synchronizing a secondary medium to a video stream in an apparatus by applying scene change detection to the video stream, said method including steps of:
(a) receiving at a data input arrangement of the apparatus the secondary medium and the video stream;
(b) analyzing in a data processor of the apparatus the video stream conveyed via the input arrangement for detecting occurrence of scene changes therein; and
(c) synchronizing in the apparatus presentation of the video stream and the secondary medium concurrently to a user based upon the secondary medium including identifiers corresponding to the scene changes in the video stream, wherein the secondary medium includes an ambilight script, the method when applied in the apparatus being operable to synchronize the ambilight script to the video stream.

According to a fifth aspect of the invention, there is provided software operable on computing hardware of an apparatus according to the second aspect of the invention, for implementing a method according to the fourth aspect of the invention.

According to a sixth aspect of the invention, there is provided a data structure for an ambilight script for use as a secondary medium for an apparatus according to the second aspect of the invention, the data structure including scene change indicators, and ambilight changes accompanying each scene.

Optionally, in the data structure, the ambilight script includes one or more parameters for dynamically controlling scene change analysis of a video stream to which the ambilight script is adapted to complement.

The phrase "data structure" is to be interpreted in a similar manner to data signal format which is subject matter which has been earlier shown to be susceptible to attracting patent right protection.

It will be appreciated that features of the invention are susceptible to being combined in any combination without departing from the scope of the invention as defined by the accompany claims.

Embodiments of the present invention will now be described, by way of example only, with reference to the accompanying drawings wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

Referring to FIGS. 1 and 2 described in the foregoing, the present invention is concerned with automatic methods of synchronizing two data signals, for example the aforesaid ambilight script 100 to its corresponding video material 110. It is known to synchronize by way of watermarking, and by way of extracting fingerprints from signals. Such fingerprints are conventionally determined for portions of a data signal, for example fingerprints can be derived for 2-second playing portions of the video material 110 as described in the international PCT patent application PCT/IP2004/051259 (WO 2005/011281). However, such a previously known approach is computationally involved and is also sub-optimal in the case of ambilight technology. Moreover, it is often inconvenient to have to access an external database for fingerprint matching purposes as such access prevents stand-alone operation desirable for consumer electronic video products.

The present invention is intended to be able to cope, for example, with a situation where the user 20 purchases a DVD, the DVD having recorded thereon the video material 110, also conveniently referred as video content. The user 20 plays the DVD on the user's ambilight system 30, 40, optionally with ambilight derived from analysis applied to the video material 110, finds the video material agreeable 110. The user 20 may subsequently find, when surfing the Internet, that a latest version of the corresponding ambilight script 100 is available to accompany the video material 110, the video material both including image and sound information, and then proceeds to download the script 100 from the Internet. Alternatively, the apparatus 400 may verify availability of script or updates thereof without any user interaction, which offers more convenience in that the user need not be bothered with looking for updates. When the user's ambilight system 30, 40 is operable according to the present invention, the ambilight system 30, 40 may be capable of synchronizing the latest version of the ambilight script 100 to the video material 110 and providing the user 20 with an enhanced viewing experience of the downloaded script 100 synchronized to the video material 110 presented to the user 20. Synchronization of the script 100 to the video material 110 pursuant to the present invention will now be further described.

Figure 3:
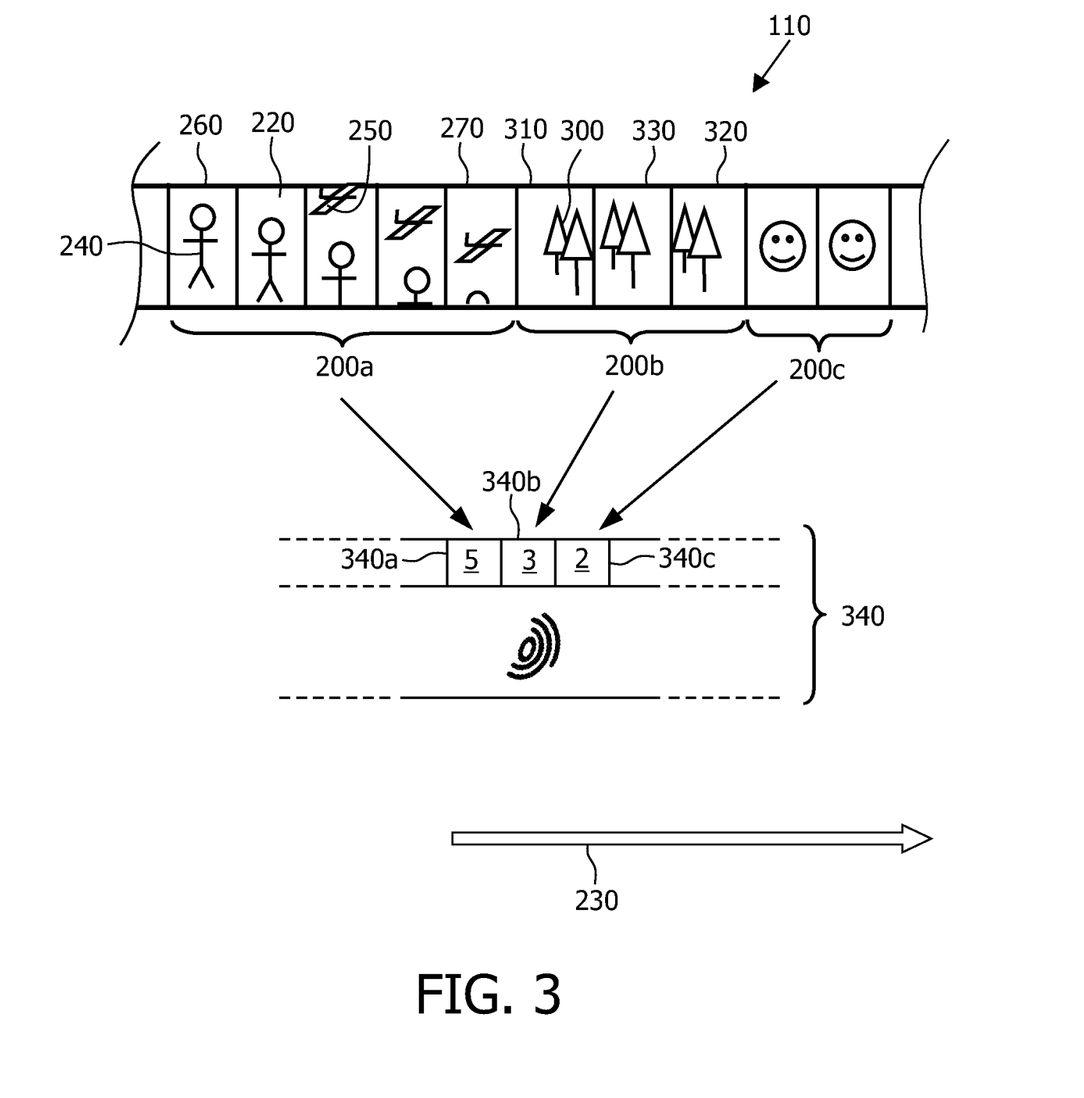
FIG. 3 is an illustration of a fingerprint and sequences of images forming scenes in video material susceptible to being presented on the ambilight system as depicted in FIG. 1.

Referring to FIG. 3, the video material 110 is generally distinguished in that it comprises a sequence of scenes denoted by 200a, 200b, 200c and so forth. The video material 110 comprises a sequence of video images which are susceptible to being presented in a temporal sequence as denoted by an arrow 230 when consumed by the user 20. For example, the sequence includes a video image denote by 220 included in the first scene 200a. Conveniently, the images are optionally coded in the video material 110 as contemporary MPEG-4 data comprising I-frame data, P- frame data and B-frame data. When encoded as contemporary MPEG-4 data, each scene 200a, 200b, 200c can included several I-frames; an I-frame is operable to define all details of an corresponding image whereas B-and P-frames define progressive changes occurring in relation to their nearest preceding I-frame. MPEG-4 encoding is often employed in contemporary data distribution systems on account of a degree of data compression that can be thereby achieved.

In the first scene 200a, there is shown from left to right a panning motion wherein a camera used to record the images of the first scene 200a is progressively panned from a person denoted by 240 to an aircraft denoted by 250 hovering above the person 240; a first image 260 in the scene 200a is completely different a last image 270 in the sequence 200a, although a progressive transition occurs from the first image 260 to the last image 270. Moreover, in the second scene 200b, trees denoted by 300 are panned from a right side of the images of the sequence 200b to a left side thereof; the first and last images 310, 320 respectively of the sequence 200b include at least in part similar image feature details. Furthermore, in the third scene 200c, each image of the scene 200c is mutually substantially identical.

In the method of the present invention, the video material 110 is analyzed, preferably at point of consumption when presented to the user 20, to determine scenes occurring within the video material 110. As addressed in the foregoing, changes in scene in the video material 110 are potentially identifiable in the method of the invention from one or more of:

(a) a sudden change from a given image $I_n$ in the sequence to a subsequent image $I_{n+1}$ in the sequence in relation to a general illumination intensity or color designation of respective pixels of the images $I_n$ and $I_{n+1}$; for example, a sudden change occurs between the image 270 and its subsequent image 310 when the image 270 corresponds to an open sunny environment whereas the subsequent image 310 corresponds to a dark forest;

(b) a sudden change in substantially all spatial image features present in the given image $I_n$ relative to its subsequent image $I_{n+1}$; and (c) a sudden change in audio spectral content associated with the given image $I_n$ relative to its subsequent image $I_{n+1}$.

Conversely, images which are contiguous in a given scene are identified by the method from one or more of:

(d) the given image $I_n$ and its subsequent image $I_{n+1}$ have spatial image features which correlate or are otherwise common to the images $I_n$, $I_{n+1}$; for example, the image 310 in the scene 200b and its subsequent image 330 both include substantially similar tree features;

(e) the given image $I_n$ and its subsequent image $I_{n+1}$ have substantially similar general illumination intensities; and (f) the given image $I_n$ and its subsequent image $I_{n+1}$ have substantially similar associated audio spectral content.

In determining whether of not two consecutive images in the sequence of images comprising the video material 110, the method of the invention is optionally operable to apply threshold comparisons. Thus, a characterizing parameter $K_i$ describing similarity, and hence also a measure of difference between contiguous images in the sequence, is optionally computed or otherwise derived by the method of the invention by applying a processing function F generally described by Equation 1 (Eq. 1):

$$K_i = F(\Delta A_i, \Delta S_i, \Delta I_i) \qquad \text{Eq. 1}$$

wherein $\Delta A_i$ = a measure of a difference in audio spectral characteristics associated with the images $I_n$ and $I_{n+1}$;

$\Delta S_i$ = a measure of a differenced in spatial feature information associated with the images $I_n$ and $I_{n+1}$; and $\Delta_i$ = a measure of a differenced in spatial feature information associated with the images $I_n$ and $I_{n+1}$.

When applying the method to determine whether or not a scene change has occurred in the sequence of images of the video material 110, a threshold can optionally be applied such the images $I_n$ and $I_{n+1}$ are contiguous within a scene if the characterizing parameter $K_i$ has a value below a threshold T (i.e. $K_i < T$), and scene change has occurred between the images $I_n$ and $I_{n+1}$ when the parameter $K_i$ exceeds the threshold T (i.e. $K_i > T$). Optionally, one or more of the measures $\Delta A_i$, $\Delta S_i$, $\Delta_i$ can be subject to comparison with one or more thresholds in a process of computing Equation 1. Other forms of discrimination in contrast to applying one of more thresholds can optionally be used in the method.

Thus, apparatus of the user 20 operable to receive the video material 110 and the ambilight script 100 and apply the aforementioned method of the invention to the video material 110 is capable of identifying scene changes occurring in the sequence of images comprising the video material 110; from the scene changes, durations of the scenes are derived and thereby a fingerprint 340 pertaining to the video material 110. Moreover, the apparatus is beneficially operable to detect such scene changes in real-time when handling the video material 110 for presenting it to the user 20 for consumption. Alternatively, the apparatus can be instructed to pre-analyze the received video material 110 and modify the material to include the markers 130 indicative of occurrences of scene change, or the fingerprint 340. Thus, the aforementioned fingerprint 340 generated from the video material 110 can either be pre-generated or progressively generated in real-time.

It will be appreciated that sudden effects included in the sequence of images of the video material 110, for example a lightening strike with associated sudden light flash and thunder sound, is susceptible to causing the apparatus to potentially incorrectly detect a scene change. However, this is not a problem if the ambilight script 100 is similarly coded so that a lightening strike is represented therein as a scene change in the script 100. Such a lightening strike would cause, when interpreting the script 100 in the apparatus, the ambilight sources 140 to simulating a lightening effect in synchronism with an image of a lightening strike being present on the television screen 30.

The ambilight script 100 is beneficially encoded in terms of a series of scenes wherein the number of images comprising to each scene is described in the script 100 together with parameters controlling a manner in which the light sources 40 are to be driven during the scene. In other words, the ambilight script 100 is preferably generated to match the aforementioned fingerprint 340 which is derivable from the video material 110. Thus, the script 100 optionally provided an index a indicative of which scene is being considered in the series, and a parameter $N_a$ indicative of a number of images in the particular scene with index a. Within a given scene, for example the first scene 200a, the ambilight sources 40 will receive a changing drive, for example changes in intensity and/or color, as the images included in the given scene are presented to the user 20 for consumption. Optionally, the script 100 can include one or more threshold parameters, for example the aforementioned threshold T, for use in computing the function F described by Equation 1 (Eq. 1) when applying the method of the invention so as to enable the apparatus to more reliably detect scene changes as also described in the script 100.

Thus, as an example, the ambilight script 100 can be optionally structured in a manner as provided in Table 1.

TABLE 1

| Scene series index α | Number of images comprising scene with index α, $N_\alpha$ | Ambilight drive parameter L for ambilight intensity, and G for ambilight color | Number of images Q over which the drive parameters L and G are applied to control the sources 140 | Additional optional encoding parameters $P_\alpha$ |
|---|---|---|---|---|
| 1 | $N_1$ = 200 | L = 10, G = grey | Q = 150 | 500 |
|   |             | L = 20, G = blue | Q = 50  | 550 |
| 2 | $N_2$ = 401 | L = 15, G = yellow | Q = 200 | 450 |
|   |             | L = 18, G = orange | Q = 201 | 480 |
| 3 | $N_3$ = 2000 | L = 22, G = blue | Q = 2000 | 500 |
| ... | ... | ... | ... | ... |
| Z | $N_Z$ = 1002 | L = 12, G = red | Q = 1002 | 500 |

In Table 1, the ambilight script 100 is subdivided into ambilight instructions corresponding to a series of scenes commencing with a scene a=1 and ending with a scene a=z. A number of image comprising a given scene is denoted by $N_a$, for example a first scene a=1 has 200 images therein. A magnitude of ambilight illumination for each scene is controlled via a parameter L in the script 100; for example, the first scene a=1 has an ambilight illumination magnitude of 10 for a first 150 images of the first scene, and an ambilight illumination magnitude of 20 for a second 50 images of the first scene, the first scene including 200 images in total. Similarly, a color of the ambilight illumination for the first scene has a quality "grey" for the first 150 images of the first scene as denoted by a parameter G, and has a quality "blue" for the second 50 images of the first scene, namely a=1; optionally, the color generated by each illumination source 40 can be individually specified in the script 100 relate to other illumination sources present. Although the first scene a=1 is primarily elucidated here, it will be appreciated that subsequent scenes in the script follow in a related manner. Optionally, the script 100 includes a parameter $P_a$ which can be used to control dynamically analysis of the video material 110, for example dynamically varying the threshold parameter T applied to detect where scene changes occur in the video material 110 for more reliably synchronizing it to the ambilight script 100.

Although Table 1 illustrates a manner in which the ambilight script 100 can be structured, it will be appreciated that alternative arrangement of ambilight-controlling script data is feasible within the scope of the present invention as defined by the accompany claims.

In one such example, the quantity Q is taken to be 1. Id est, the ambilight script comprises an explicit setting for each separate video frame. This has the advantage that the ambilight script may have full control with a high resolution in time.

In another such example, the ambilight script controls a parameter that affects the content analysis algorithm that controls the light speakers. An example of such a parameter is the relaxation time that determines how many frames are analysed before the colors are accordingly adapted. This parameter is normally set quite long, in that a too nervous light effect is to be avoided, but in order to accurately follow the flash of a lightning it should be quite short, maybe even a single frame. Controlling such parameter in accordance with the invention has the advantage that the flash of a lightning may be accurately followed because the parameter is temporarily set to quite small value, while avoiding a too nervous light effect during other passages of e.g. a movie. This combination of controlling a parameter in accordance with the invention with the known content analysis techniques has the additional advantage that the ambilight scripts may be relatively small in that only a few bits may suffice to control the parameter.

Figure 4:
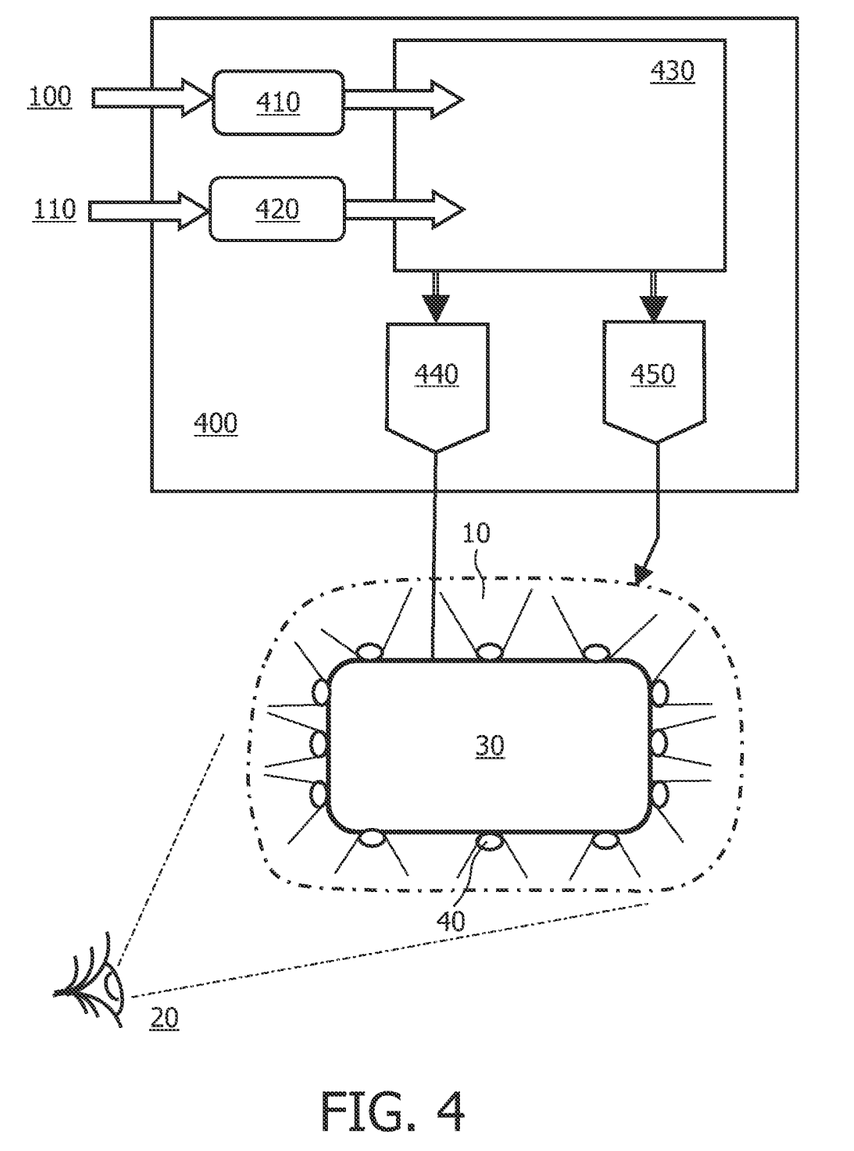
FIG. 4 is an illustration of an apparatus configured to implement the system of FIG. 1.

In FIG. 1, typical parts of an ambilight system from a viewpoint of the user 20 are illustrated. In FIG. 4, a configuration of system hardware is illustrated in schematic form. Referring to FIG. 4, a system for synchronizing the video material 110 with the ambilight script 100 is denoted by 400. The synchronization system 400 comprises data buffers 410, 420 for receiving the video material 110 and the ambilight script 100 respectively. As elucidated in the foregoing, the material 110 and script 100 are susceptible to being provided from mutually different data sources as contemporarily experienced in multimedia environments. The synchronization system 400 further includes a synchronization processor 430 which is implemented in digital hardware; optionally, the processor 430 can be implemented using computing hardware operable to execute software causing the computing hardware operable to perform a synchronizing function as elucidated earlier. Moreover, the system 400 further includes drivers 440, 450 for outputting video data to the television 30 and to the one or more ambilight sources 40 providing the ambilight illumination 10 respectively. When there are numerous ambilight sources 40 which are each susceptible to being independently driven based upon data included in the script 100, the driver 450 includes a corresponding plurality of driver channels; in other words, the ambilight illumination 10 can be of spatially varying color at any given instant of time when in operation.

When in operation, the processor 430 is operable to synchronize the video material 110 by determining whereat scene changes occur therein, for example as described earlier with reference to FIG. 3; the processor 430 is thereby operable to determine a corresponding fingerprint 340 of the video material 110. The processor 430 is then operable to determine data for corresponding scene changes in the script 100 received into the buffer 410 and determine therefrom suitable data to output to the buffer 450 for driving one or more illumination sources 40, both with regard to color as well as illumination intensity. As elucidated earlier, scene changes may be found by analysis based on one or more of:

(a) abrupt video material illumination changes between at least a last image of an earlier scene in relation to at least a first image of a subsequent scene;
(b) abrupt changes in spatial image feature information between the at least last image of the earlier scene in relation to the at least first image of the subsequent scene;
(c) abrupt changes in audio information associated with the at least last image of the earlier scene in relation to the at least first image of the subsequent scene.

Optionally, detection of scene changes within the video material 110, and hence generation of the aforementioned fingerprint 340, can be detected not only on the basis of immediately adjacent images but information gathered from several preceding images and several subsequent images to improve detection reliability.

Optionally, the processor 430 can be operable to switch to a normal contemporary mode of ambilight control of the ambilight illumination 10 based solely on the video material 110 in an event that the processor 430 is unable, during concurrent presentation of the video material 110 with the ambilight script 100 to the user 20, to adequately synchronize the ambilight script 100 to the video material 110; by such automatic switching, disruption of an enhanced viewing experience provided to the user 20 can at least partially be circumvented, namely circumvents a sudden loss of the ambilight illumination 10 in an event that the processor 430 is found to be unable to adequately synchronize the video material 110 to the video script 100.

The synchronization system 400 is susceptible to be included as an integral part of a television receiver. Alternatively, the system 400 can be provided to the user 20 as an add-on unit, for example as an add-on "digital black box", or as what is known in the art as set top box or multimedia PC. Yet alternatively, the synchronization system 400 can be implemented in software which is downloadable via, for example, multimedia or other communication channels, to a television equipped with computing hardware; such an implementation if of benefit in that the processor 430 can effectively be updated as more advanced ambilight scripts 100 become available in the future to the user 20.

Optionally, the video material 110 is provided as a video stream, for example from a digital broadcast provider. Moreover, the ambilight script 100 is provided as a secondary media. Although synchronization of the ambilight script 100 to the video material 110 is described by way of scene identification in the video material 110, it will be appreciated that other types of scripts can be in a similar manner synchronized to the video material 110. For example, an alternative type of script can be a "smell script" wherein the synchronization system 400 is provided with electronically controllable smell generators which can be selectively activated based upon a smell script synchronized by way of detection of scene changes occurring in the video material 110. Other types of secondary multimedia scripts include an air flow script which controls an air flow around a user, but still other types are also feasible.

An Ambilight system is a system for creating light effects around e.g. a TV screen to generate a more immersive viewing experience. It is known in the art how derive the effects from the video content, but a subjectively better effect may be created by a special effects artist instructing or controlling the Ambilight system. The artist may use a tool that shows the video and allows the artist to define the special light effects. The result may be a script that needs to be correlated with the original video contents.

A relatively easy way to distribute the script is to combine it with the video material in one medium, like an optical disc like a DVD or in a broadcast stream. As Ambilight is currently not a standard feature, this method of synchronization is currently not widely available.

Using a separate source in like the Internet, it may be advantageous to be able to download a script for controlling the Ambilight system without having to download the video. This requires a synchronization method that allows both script and video to be separately obtained, while still enabling to synchronize the script with the video.

According to an embodiment of the invention, a unique fingerprint 340 may be derived from a video stream by counting the time between two scene changes, referred to as "scene change stamp". A sequence of N scene change stamps is defined as a "sequence fingerprint" 340. By using the same sequence fingerprints in the script it is possible to synchronize the script with the video. The invention is also suitable for other secondary media that require synchronization with the video contents. The invention overcomes the problem to have scripts and video in one media, just to ensure that both are synchronized. This invention also allows for multiple scripts that can be generated independent in time or location of the video that is viewed on the screen.

One feature of the invention is that time between scene changes can be used as a low cost reliable fingerprinting method which is relatively insensitive to the contents, content deterioration or video/broadcast standard (NTSC (60 Hz), PAL (50 Hz), etc.) and relatively sensitive for extensive video editing (causing an entirely new video).

To ensure that the secondary media are synchronized with the video that could come from a totally different source, a kind of fingerprinting may be used that uniquely identifies the video.

The invention is partially based upon the insight that no matter where the video material comes from, if it is not edited (frames removed or re-sequenced), the time between scene changes helps in identifying a video scene, especially if matching is done over a number of scene changes. The time between two scene changes may be derived from the video frame rate and the number of frames.

This embodiment of the fingerprint 340 according to the invention is relatively low cost as only the abilities to detect scene changes and to determine the video frame rate are needed. These abilities are as such and separately known in the art and maybe considered standard functionality, in being already present in TVs and requiring little hardware resources.

The invention may be embodied in a script authoring tool that takes the video as primary input and generates video related output, e.g. an Ambilight script with scene change stamps for each scene change.

The resulting output, e.g. the script may be downloaded to a device, e.g. a TV. The device can take the first N scene change stamps as a unique starting key. The video that is displayed on the screen is analyzed and the frames per scene are counted and multiplied by the inverse frame rate, resulting in the "scene change stamp". Once the first of the N scene change stamps matches with the script, the second of the N scene change stamps is checked, up to the N-th scene change stamp. N maybe predetermined and e.g. chosen to be big enough to have a low false-positive detection like 0.01% and a high detection probability, e.g. a 99.99% score, and small enough to prevent a too large synchronization time.

Once the script is locked, i.e. is synchronized with the video, its contents is analysed or interpreted and is used to control the Ambilight system, the results being rendered as a visual effect around the TV screen.

At the moment a commercial break occurs or when the video is otherwise interrupted, the scene change stamps start to mismatch and the script may be paused. A search area before and after the break in the script may be checked for matching scene change stamps. This strategy for resynchronization is based on the movie being started or continued a bit earlier than the actual break to allow people watching to recap.

When there is no script running or the synchronization is lost, the Ambilight system may be set to its default mode in which the system follows the video content.

Besides for Ambilight, any other application that needs to be synchronized with video may make use of this invention. Examples include: downloadable subtitles e.g. for movies, additional sound tracks, like a remix, video related animations and comments.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural.

Numerals included within parentheses in the accompanying claims are intended to assist understanding of the claims and should not be construed in any way to limit subject matter claimed by these claims.

The invention claimed is:

1. An apparatus operable to generate a fingerprint of a video stream, said apparatus including:
   a data input arrangement for receiving the video stream;
   a data processor for analyzing the video stream conveyed via the input arrangement for detecting occurrences of scene changes therein, and for computing durations of scenes included in the video stream from said detected occurrence of scene changes, and for generating from said durations said fingerprint as a sequence of consecutive said durations.

2. The apparatus as claimed in claim 1, wherein the processor is operable to detect scene changes within the video stream by analysis based on one or more of:
   abrupt video material illumination changes between at least a last image of an earlier scene in relation to at least a first image of a subsequent scene;
   abrupt changes in spatial image feature information between the at least last image of the earlier scene in relation to the at least first image of the subsequent scene; and
   abrupt changes in audio information associated with the at least last image of the earlier scene in relation to the at least first image of the subsequent scene.

3. A method of generating a fingerprint from a video stream, wherein said method includes:
   receiving said video stream;
   detecting occurrences of scene changes in said video stream;
   computing durations of scenes included in the video stream from said detected occurrence of scene changes; and
   generating said fingerprint as a sequence of consecutive said durations.

4. The method as claimed in claim 3, wherein detecting occurrences of scene changes involves detecting scene changes within the video stream by analysis based on one or more of:
   abrupt video material illumination changes between at least a last image of an earlier scene in relation to at least a first image of a subsequent scene;
   abrupt changes in spatial image feature information between the at least last image of the earlier scene in relation to the at least first image of the subsequent scene; and
   abrupt changes in audio information associated with the at least last image of the earlier scene in relation to the at least first image of the subsequent scene.

5. A method of synchronizing a secondary medium to a video stream in an apparatus by applying scene change detection to the video stream, said method including:
   receiving at a data input arrangement of the apparatus the secondary medium and the video stream;
   analyzing in a data processor of the apparatus the video stream conveyed via the input arrangement for detecting occurrence of scene changes therein; and
   synchronizing in the apparatus presentation of the video stream and the secondary medium concurrently to a user based upon the secondary medium being associated to identifiers corresponding to the scene changes in the video stream, wherein said identifiers include a sequence of consecutive durations, each duration representing a duration of a scene in the video stream.

6. The method as claimed in claim 5, wherein the association between the identifiers and the secondary medium is included on the secondary medium.

7. The method as claimed in claim 6, wherein the identifiers are included upon the secondary medium.

8. A method of synchronizing a secondary medium to a video stream in an apparatus by applying scene change detection to the video stream, said method including:
   receiving at a data input arrangement of the apparatus the secondary medium and the video stream;
   analyzing in a data processor of the apparatus the video stream conveyed via the input arrangement for detecting occurrence of scene changes therein; and
   synchronizing in the apparatus presentation of the video stream and the secondary medium concurrently to a user based upon the secondary medium being associated to identifiers corresponding to the scene changes in the video stream,
   wherein the secondary medium includes an ambilight script, the method when applied in the apparatus being operable to synchronize the ambilight script to the video stream.

9. A non-transitory computer readable medium having one or more executable instructions stored thereon, which when executed by a digital processing system cause the digital processing system to perform a method of generating a fingerprint from a video stream, the method comprising:
   receiving the video stream;
   detecting occurrences of scene changes in said video stream;
   computing durations of scenes included in the video stream from said detected occurrence of scene changes; and
   generating said fingerprint as a sequence of consecutive said durations.

* * * * *